US012061600B2

(12) United States Patent
Chamarthy et al.

(10) Patent No.: US 12,061,600 B2
(45) Date of Patent: Aug. 13, 2024

(54) API MANAGEMENT FOR BATCH PROCESSING

(71) Applicant: International Business Machines Corporation, Armonk, NY (US)

(72) Inventors: Ravi Chandra Chamarthy, Hyderabad (IN); Prateek Goyal, Bengaluru (IN); Manish Anand Bhide, Madhapur (IN); Madhavi Katari, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/865,214

(22) Filed: Jul. 14, 2022

(65) Prior Publication Data

US 2024/0020299 A1    Jan. 18, 2024

(51) Int. Cl.
*G06F 16/23*    (2019.01)
*G06F 16/21*    (2019.01)
*G06F 16/22*    (2019.01)

(52) U.S. Cl.
CPC ........ *G06F 16/2386* (2019.01); *G06F 16/211* (2019.01); *G06F 16/2282* (2019.01)

(58) Field of Classification Search
CPC .......................... G06F 16/2386; G06F 16/2282
USPC ........................................................ 707/609
See application file for complete search history.

(56) References Cited

U.S. PATENT DOCUMENTS

| | | | |
|---|---|---|---|
| 8,694,540 B1* | 4/2014 | Lin ....................... | G06F 16/211 707/777 |
| 9,508,083 B2 | 11/2016 | Yaseen et al. | |
| 11,182,695 B1* | 11/2021 | Kirsche ................. | G06N 3/088 |
| 11,341,154 B2* | 5/2022 | Mitra ..................... | G06F 40/211 |
| 2016/0088006 A1 | 3/2016 | Gupta et al. | |
| 2017/0063908 A1 | 3/2017 | Muddu et al. | |
| 2017/0308559 A1* | 10/2017 | Shams ................. | G06F 16/258 |
| 2018/0052861 A1 | 2/2018 | Seetharaman et al. | |
| 2019/0318272 A1* | 10/2019 | Sassin .................. | G06F 16/254 |
| 2020/0409945 A1* | 12/2020 | Chen ................. | G06F 16/24578 |

OTHER PUBLICATIONS

Alves Jose M. et al: "ML4IoT: A Framework to Orchestrate Machine Learning Workflows on Internet of Things Data", IEEE Access, [Online] vol. 7, No. 7, Jan. 1, 2019 (Jan. 1, 2019), pp. 152953-152967, XP093059354, DOI: 10.1109/ACCESS.2019. 2948160 Retrieved from the Internet: URL:https://ieeexplore.ieee. org/ielx7/6287639/8600701/08876834.pdf> [retrieved on Jun. 29, 2023].

(Continued)

*Primary Examiner* — Muluemebet Gurmu

(57) ABSTRACT

An example operation may include one or more of storing a batch scoring engine and an application programming interface (API) for the batch scoring engine, receiving a trigger to perform a batch prediction process, reading input data from a source data store and executing, via the batch scoring engine, one or more predictive models on the input data to generate a predictive output and metadata associated with the predictive output, storing the predictive output and the metadata in a target data store, and updating the API with a location of the predictive output within the target data store and a location of the metadata within the target data store.

20 Claims, 13 Drawing Sheets

(56) References Cited

OTHER PUBLICATIONS

International Search Report and Written Opinion issued in the International Application No. PCT/IB2023/054634, mailed on Jul. 7, 2023.
Unknown, Title: Batch Prediction API, Published in DataRobot Docs on Nov. 10, 2021.
Unknown, Title: Deploy models with REST (preview) for batch scoring Published in Microsoft.
Unknown, Title: Managing Machine Learning Models Using REST APIs Published in SAP.
Unknown, Title: SAS® Model Manager, Published in SAS.

* cited by examiner

370

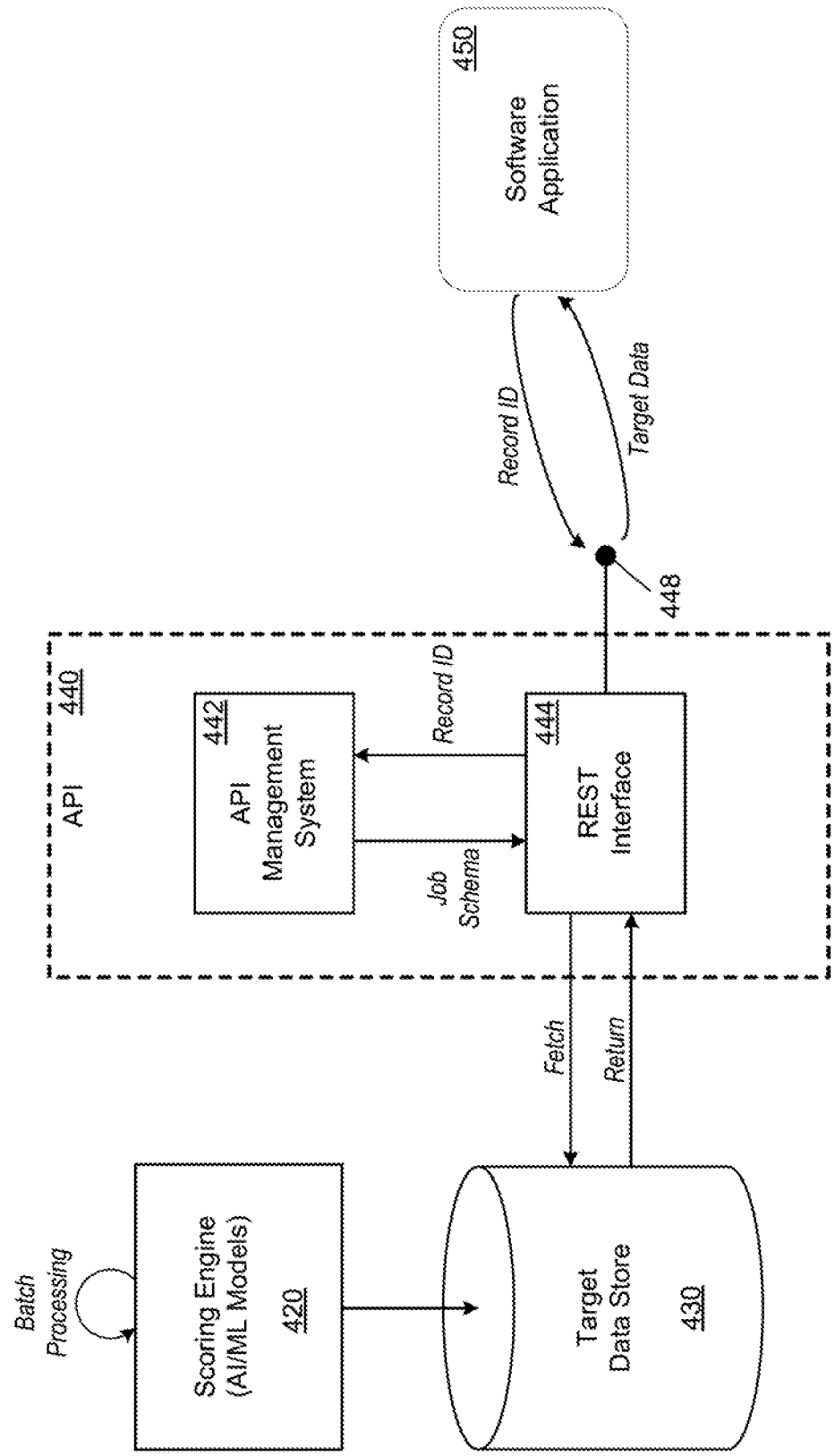

API MANAGEMENT FOR BATCH PROCESSING

BACKGROUND

Broadly speaking there are two types of scoring (predicting) processes based on artificial intelligence (AI) models and machine learning (ML) models. Online scoring refers to a process in which the predictive model generates a prediction based on a small data set in a synchronous manner. Meanwhile, batch scoring is performed asynchronously on large data sets. In this process, a batch scoring engine receives a source data location, with feature data to be input to the model, and a target data location where the prediction is to be stored.

As an example, a batch scoring process may be used to predict a likelihood of a customer to churn (e.g., leave a service/subscription, etc.) The scoring process may be periodically run (e.g., at the end of every month, etc.) based on updated customer data stored in the source data store. When a software application desires to consume the predictive results of the customer, the application must find where the results of the latest batch run are stored in the target data store. This can be a challenging task because the format and location of the model output may change over time. For example, results may be stored across different nodes of a distributed storage, different storage locations, different databases, and the like. Another challenge that exists is that metadata with respect to the predictive results is also stored in a different location.

SUMMARY

One example embodiment provides an apparatus that includes a memory configured to store a batch scoring engine and an application programming interface (API) for the batch scoring engine, and a processor configured to one or more of receive a trigger to perform a batch prediction process, read input data from a source data store and iteratively execute, via the batch scoring engine, one or more predictive models on the input data to generate a predictive output and metadata associated with the predictive output, store the predictive output and the metadata in a target data store, and update the API with a location of the predictive output within the target data store and a location of the metadata within the target data store.

Another example embodiment provides a method that includes one or more of storing a batch scoring engine and an application programming interface (API) for the batch scoring engine, receiving a trigger to perform a batch prediction process, reading input data from a source data store and executing, via the batch scoring engine, one or more predictive models on the input data to generate a predictive output and metadata associated with the predictive output, storing the predictive output and the metadata in a target data store, and updating the API with a location of the predictive output within the target data store and a location of the metadata within the target data store.

A further example embodiment provides a computer-readable medium comprising instructions, that when read by a processor, cause the processor to perform one or more of storing a batch scoring engine and an application programming interface (API) for the batch scoring engine, receiving a trigger to perform a batch prediction process, reading input data from a source data store and executing, via the batch scoring engine, one or more predictive models on the input data to generate a predictive output and metadata associated with the predictive output, storing the predictive output and the metadata in a target data store, and updating the API with a location of the predictive output within the target data store and a location of the metadata within the target data store.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4C is a diagram illustrating a process of fetching results of a batch scoring process via the API, according to example embodiments.

DETAILED DESCRIPTION

Figure 1:
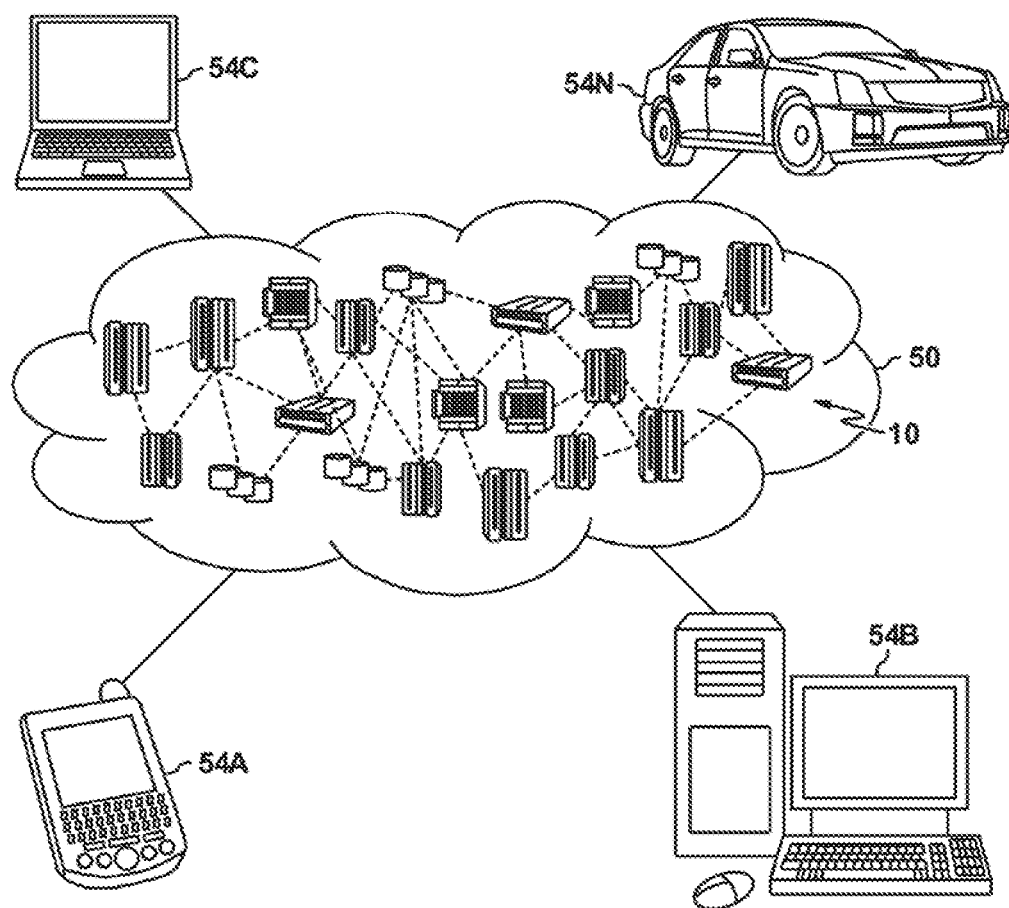
FIG. 1 is a diagram illustrating a cloud computing environment that interacts with various devices according to an example embodiment.

It is to be understood that although this disclosure includes a detailed description of cloud computing, implementation of the teachings recited herein is not limited to a cloud computing environment. Rather, embodiments of the present invention are capable of being implemented in conjunction with any other type of computing environment now known or later developed.

The example embodiments are directed to a model training environment, such as a cloud platform, web server, or other host, that may train and even use a machine learning model to compare the content of different documents (e.g., paper documents that have been scanned into an electronic document format, electronic documents, etc.) In particular, the machine learning model may convert bounding boxes into vector space (BBox2Vector Model). In some embodiments, the two document being compared may be directed to the same thing or may even be the same document, but the documents themselves may have different formats, colors, shades, data values, etc. This is common when organizations have multiple different document processing systems such as an accounting software, invoicing software, ordering software, enterprise data management (EDM) systems, and the like.

Traditionally, a batch scoring process (i.e., a prediction process) is performed by a scoring engine of a host platform such as a cloud platform. During the batch scoring process, records are asynchronously read by the scoring engine and input to one or more predictive models (e.g., AI models, ML models, etc.) which output predictions based thereon. Typically, the scoring engine creates a new table, stores the output predictions in the new table, and stores the new table somewhere in a target data store. However, when a software application desires to consume the output predictions, the software application faces a challenge in trying to find the new table. The software application must add logic to find/retrieve such data from the target data store. Furthermore, metadata of the batch scoring process (e.g., exhibitions of bias detected, concept drift, etc.) must be accessed from a separate monitoring service or the like which requires additional logic.

In the example embodiments, an application programming interface (API) is built on top of a scoring engine (e.g., predictive AI/ML models) and is updated by the scoring engine with details of the storage locations of input features, output predictions, confidence values, metadata, and the like, which are associated with a batch scoring process. It should be appreciated that any kind of predictive model may be used including a neural network, a classification model, a regression model, a time-series model, and the like. The API also exposes an endpoint which may be fixed (i.e., a fixed location for fetching predictive outputs of the batch scoring process). The fixed location essentially fixes a location for receiving API calls for fetching data from the target data store and for returning fetched data to the requesting software application. Accordingly, the software application need not worry about the underlying intricacies of where the input feature values are located, where the AI/ML output predictions are located, and how to obtain the metadata associated with such predictions. Instead, the software application can simply query the API, via the endpoint, and in response, receive the attributes of the output predictions and the metadata from the target data store.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Examples of cloud computing characteristics that may be associated with the example embodiments include the following.

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Examples of service models that may be associated with the example embodiments include the following:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Examples of deployment models that may be associated with the example embodiments include the following:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service-oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that cloud computing nodes 10 and cloud computing environment 50 can communicate with any type of computerized device over any type of network and/or network addressable connection (e.g., using a web browser).

Figure 2A:
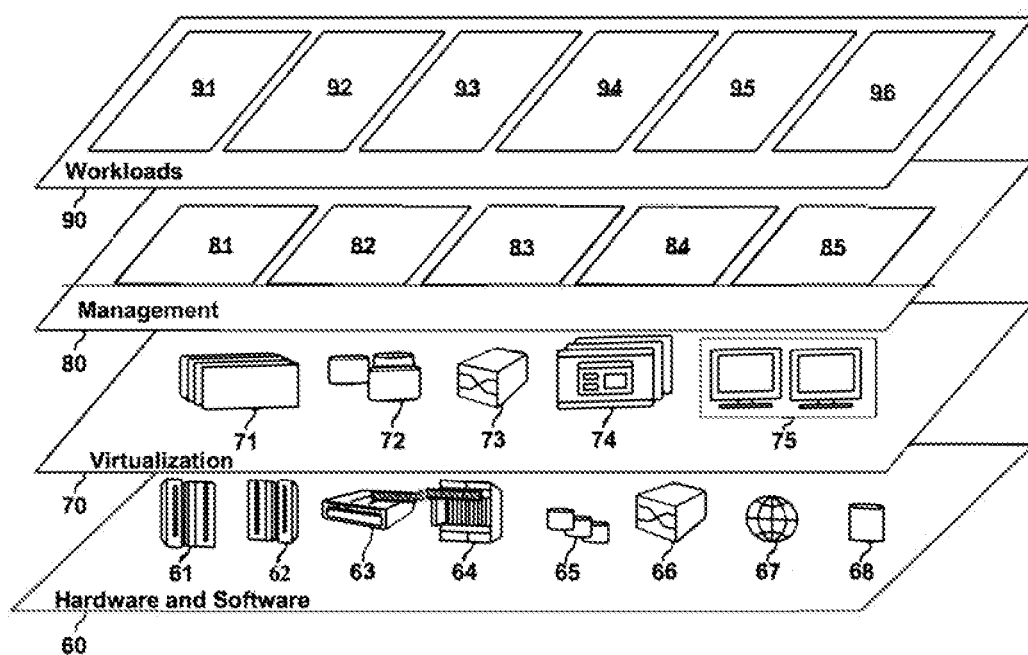
FIG. 2A is a diagram illustrating abstraction model layers of a cloud computing environment according to an example embodiment.

Referring now to FIG. 2A, a set of functional abstraction layers provided by cloud computing environment 50 FIG. 1) is shown. It should be understood in advance that the components, layers, and functions shown in FIG. 2A are intended to be illustrative only and embodiments of the invention are not limited thereto. As depicted, the following layers and corresponding functions are provided: Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workload layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and batch scoring 96.

Figure 2B:
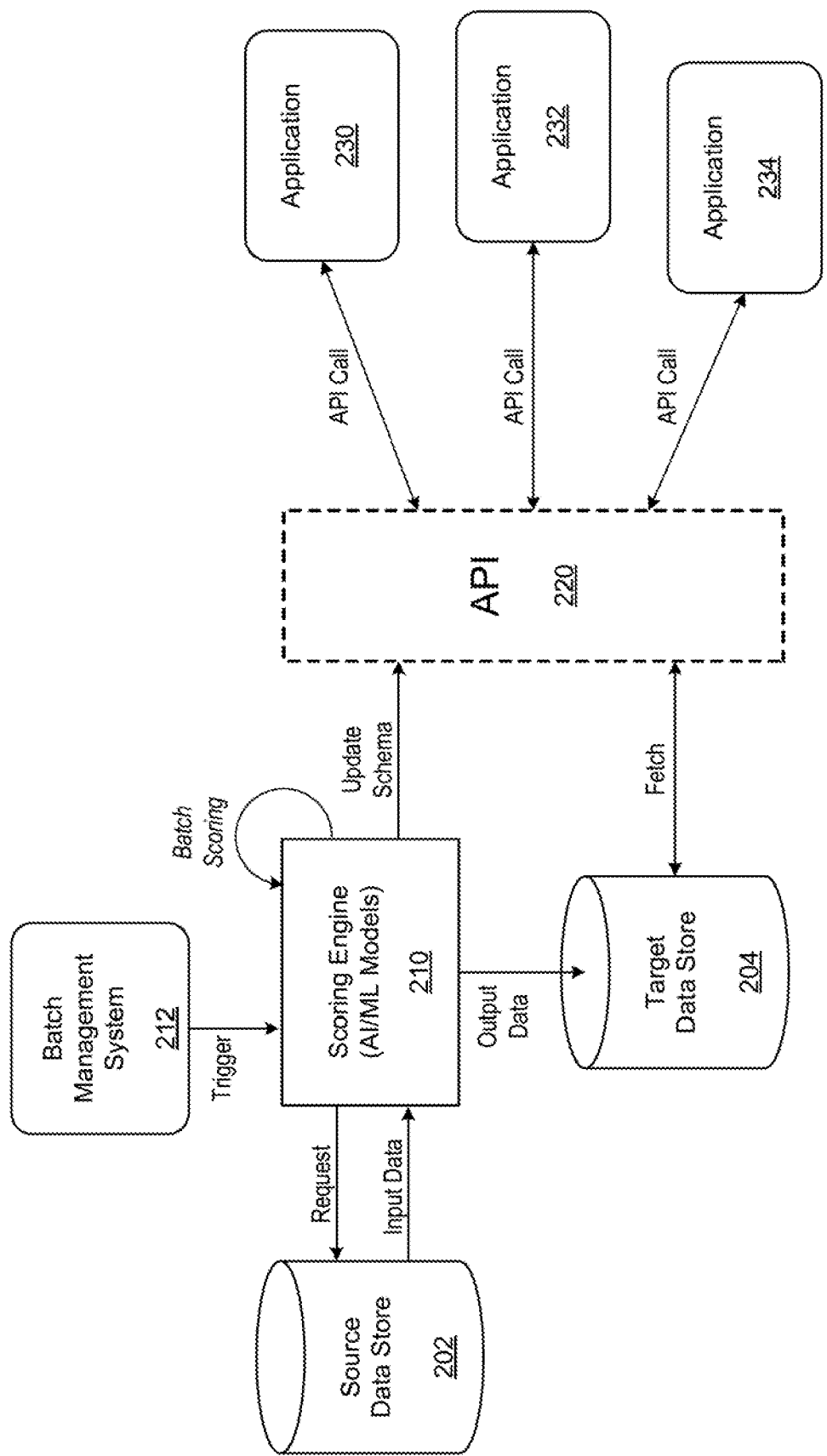
FIG. 2B is a diagram illustrating a batch processing platform for API management according to an example embodiment.

FIG. 2B illustrates a host platform 200 for performing the batch scoring 96 shown in the example of FIG. 2A, in accordance with example embodiments.

Referring to FIG. 2B, the host platform 200 may include a cloud platform and/or other environment that includes one or more computing machines that provide one or more runtime environments for batch scoring. In some embodiments, the host platform 200 may be a central architecture or it may include a distributed architecture. In the example of FIG. 2B, the host platform 200 includes a source data store 202 and a target data store 204, which may be different data stores, the same data store, and the like. It should also be appreciated that the source data store 202 and/or the target data store 204 may be external to the host platform 200 and accessed over a network connection between the host platform the respective data store. An example of the data store is a database or other storage device that may be accessed via a network. The data stores may include tables of data with columns and rows, etc. In some examples, the data stores may include OLAP cubes or other multi-dimensional data (i.e., more than two dimension, etc.)

The host platform 200 may include a batch management system 212 which manages operations of a scoring engine 210. For example, the batch management system 212 may trigger the scoring engine to perform the batch processing. The trigger may be an internal trigger initiated by the batch management system 212 or an external trigger that is received from a software application, web service, or other program. One example of a trigger is a time-based trigger that can be iteratively performed (e.g., the $5^{th}$ day of every month, etc.) The trigger signal may be sent from the batch management system 212 to the scoring engine 210. The trigger signal may identify a batch job by its unique ID, a type of model(s), a source data location, a target data location, and the like.

The scoring engine 210 may be any known scoring engine that is available today or that becomes available. The scoring engine 210 may transmit a request for input data for the batch scoring process from the source data source 202. For example, the scoring engine 210 may transmit an API call or the like with a request for data stored at the source data location identified by the trigger. In response, the source data store 202 may return the corresponding data which can be used as an input to the model or models being executed by the scoring engine 210.

Next, the scoring engine 210 may execute a batch scoring process on the input data to create output data that is stored in the target data store 204. The scoring engine 210 may asynchronously read data into the model/models and perform executions in small jobs until the entire input data set has been read and analyzed. For example, the scoring engine 210 may read in one record at a time (e.g., by file, by column, by row, by data value, by field, etc.) and execute a predictive model on the record to generate a predictive result. Each new record can be used by the scoring engine to create a new predictive result which may be output by the scoring engine 210 and stored in a file such as a table. The resulting output data may be stored in the target data store 204.

According to various embodiments, the host platform 200 also include an application programming interface (API) 220 which enables access to the batch processing content that is input to the scoring engine 210, batch processing content that is output by the scoring engine 210, metadata associated with the batch scoring process and the like. The API 220 enables software applications 230, 232, and 234 to access both the target data store 204 with the output scoring content and the metadata and the source data store 202 with the input data for the scoring process. For example, the applications 230, 232, and 234 may submit API calls to the API 220 with an identifier of a record (e.g., a record ID) associated with the batch processing. In response, the API 220 may find the batch processing content including input data, output predictions, prediction confidence, metadata (e.g., concept drift attributes of the model, bias attributes of the model, etc.), and the like.

However, the scoring engine 210 may often create new tables for output data from a batch processing job. It may also move the stored data from one data store to another such as between two types of databases, etc. To ensure that the batch processing data can be found at all times, the scoring engine 210 may update the API 220 with schema information of the batch processing job including a location within the target data store where the output data for that particular batch/record is stored, a location within the source data store where the input data was pulled from, and a location of metadata associated with the batch scoring process. The update may be performed simultaneously with the batch scoring process to ensure that the software applications and the API remain updated in real-time.

As noted above, one of the challenges of batch processing is accessing the results afterwards. The challenge arises because the source of the data and the target location for storing predictions can change over time for various reasons. The example embodiments address this challenge and make it possible for different types of software applications to have shared and continuous access to the batch processing content in real-time and without a need for any additional logic being added to the software applications. That is, different software applications may access the batch processing content in a common manner via the API.

In addition, the API may expose an endpoint that is configured to receive API calls or the like from the software applications. The API thus provides a fixed location (endpoint) for batch processing data requests from the software application and for responses from the API to the software application as a result. Accordingly, the consuming applications need not worry about the varying source/target of the batch models, and also, the consuming application need not worry about, if customer changes from one model monitoring product to another model monitoring product. For example, an API call from a software application can provide an identifier of a data record, a batch job, a batch process, or the like, which is associated with the batch processing that is of interest to the software application. This information can be used by the API to identify the locations of the input data, the output data, the metadata, and the like, retrieve the data, and return the data to the software application via the endpoint.

FIGS. 3A-3E provide various examples of additional features that may be used in association with the cloud computing environment described herein. These examples should be considered as additional extensions or additional examples of the embodiments described herein.

Figure 3A:
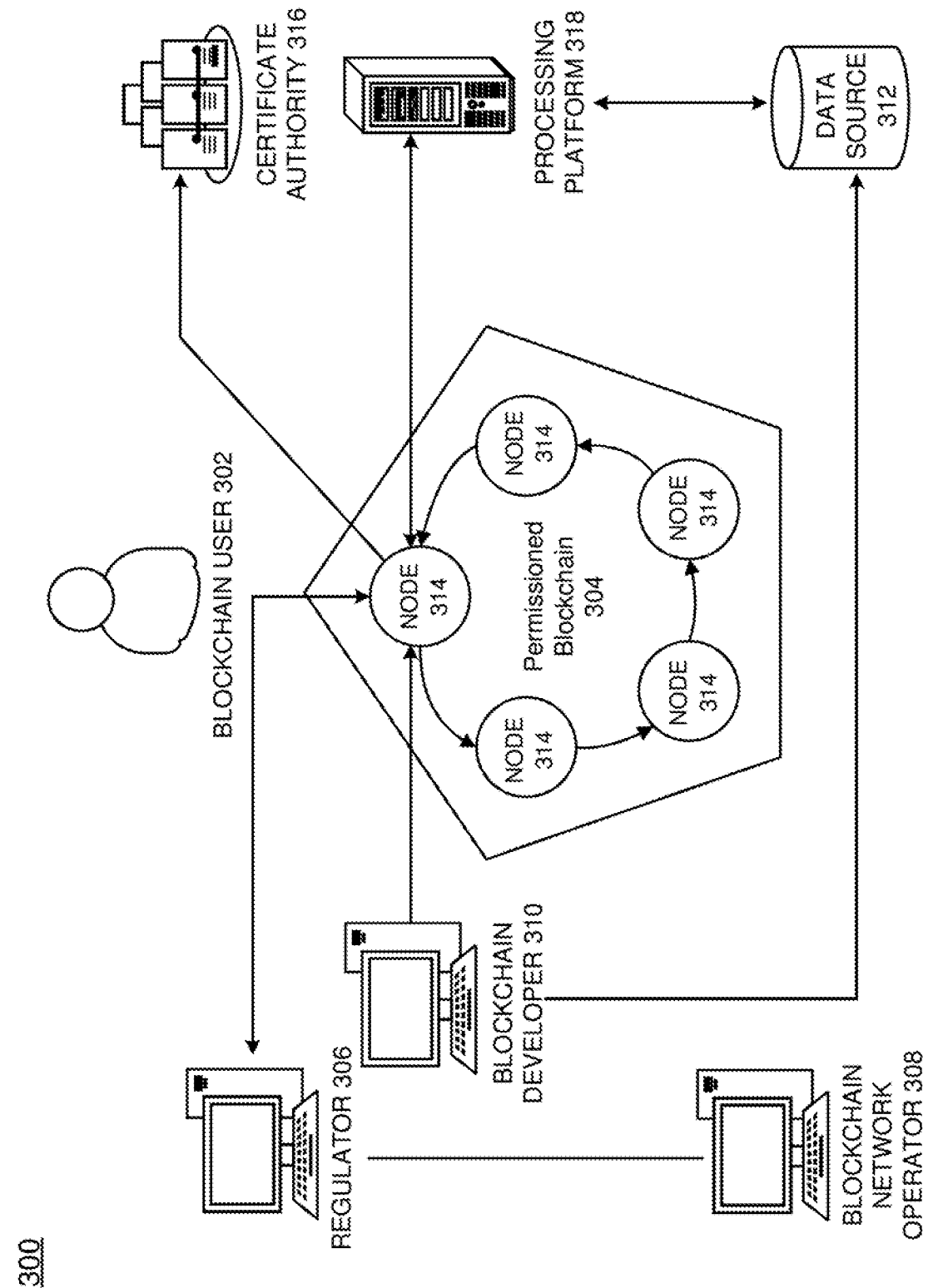
FIGS. 3A-3C are diagrams illustrating examples of a permissioned network according to example embodiments.

FIG. 3A illustrates an example of a permissioned blockchain network 300, which features a distributed, decentralized peer-to-peer architecture. The blockchain network may interact with the cloud computing environment 50, allowing additional functionality such as peer-to-peer authentication for data written to a distributed ledger. In this example, a blockchain user 302 may initiate a transaction to the permissioned blockchain 304. In this example, the transaction can be a deploy, invoke, or query, and may be issued through a client-side application leveraging an SDK, directly through an API, etc. Networks may provide access to a regulator 306, such as an auditor. A blockchain network operator 308 manages member permissions, such as enrolling the regulator 306 as an "auditor" and the blockchain user 302 as a "client". An auditor could be restricted only to querying the ledger whereas a client could be authorized to deploy, invoke, and query certain types of chaincode.

A blockchain developer 310 can write chaincode and client-side applications. The blockchain developer 310 can deploy chaincode directly to the network through an interface. To include credentials from a traditional data source 312 in chaincode, the developer 310 could use an out-of-band connection to access the data. In this example, the blockchain user 302 connects to the permissioned blockchain 304 through a peer node 314. Before proceeding with any transactions, the peer node 314 retrieves the user's enrollment and transaction certificates from a certificate authority 316, which manages user roles and permissions. In some cases, blockchain users must possess these digital certificates in order to transact on the permissioned blockchain 304. Meanwhile, a user attempting to utilize chaincode may be required to verify their credentials on the traditional data source 312. To confirm the user's authorization, chaincode can use an out-of-band connection to this data through a traditional processing platform 318.

Figure 3B:
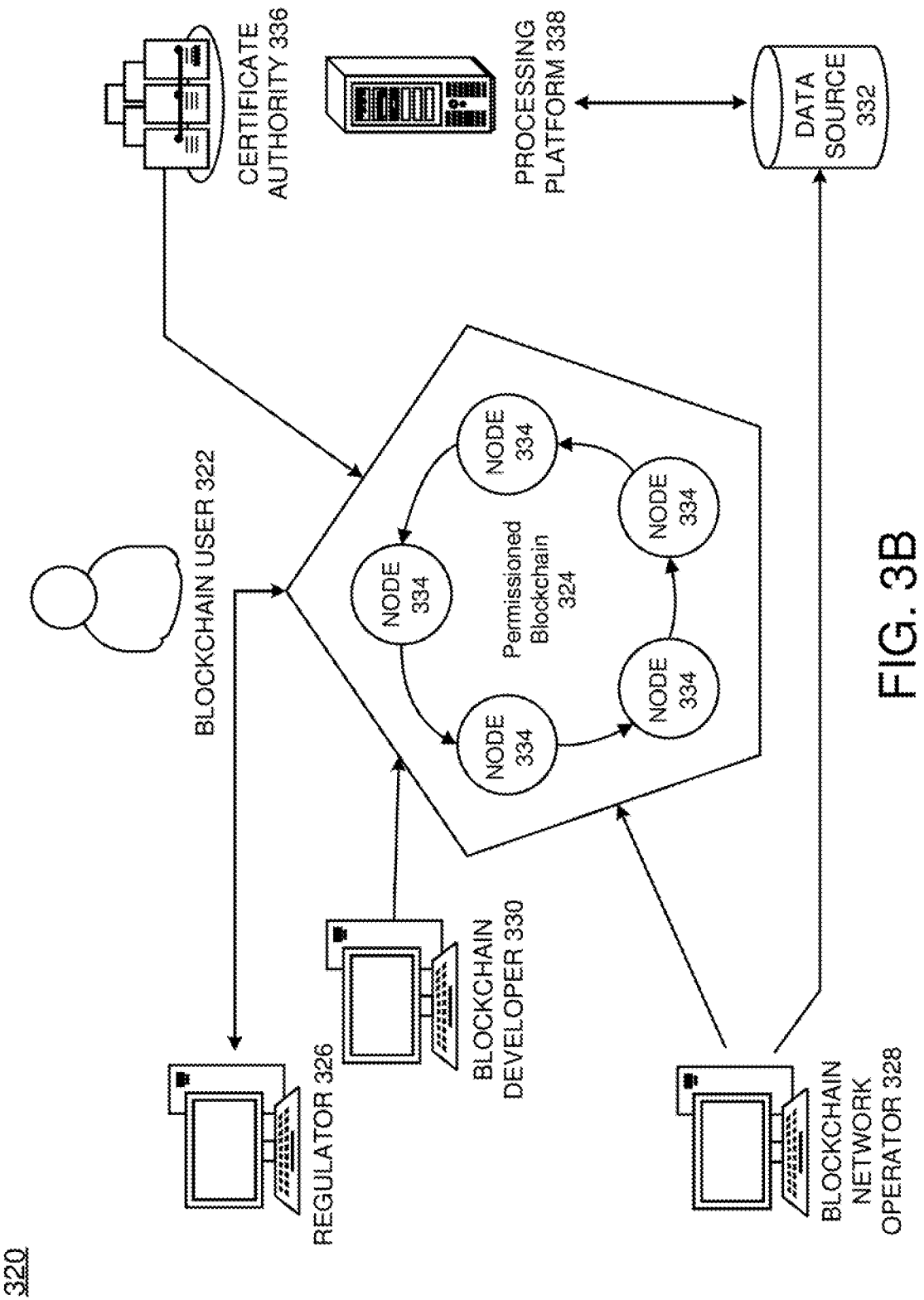

FIG. 3B illustrates another example of a permissioned blockchain network 320, which features a distributed, decentralized peer-to-peer architecture. In this example, a blockchain user 322 may submit a transaction to the permissioned blockchain 324. In this example, the transaction can be a deploy, invoke, or query, and may be issued through a client-side application leveraging an SDK, directly through an API, etc. Networks may provide access to a regulator 326, such as an auditor. A blockchain network operator 328 manages member permissions, such as enrolling the regulator 326 as an "auditor" and the blockchain user 322 as a "client". An auditor could be restricted only to querying the ledger whereas a client could be authorized to deploy, invoke, and query certain types of chaincode.

A blockchain developer 330 writes chaincode and client-side applications. The blockchain developer 330 can deploy chaincode directly to the network through an interface. To include credentials from a traditional data source 332 in chaincode, the developer 330 could use an out-of-band connection to access the data. In this example, the blockchain user 322 connects to the network through a peer node 334. Before proceeding with any transactions, the peer node 334 retrieves the user's enrollment and transaction certificates from the certificate authority 336. In some cases, blockchain users must possess these digital certificates in order to transact on the permissioned blockchain 324. Meanwhile, a user attempting to utilize chaincode may be required to verify their credentials on the traditional data source 332. To confirm the user's authorization, chaincode can use an out-of-band connection to this data through a traditional processing platform 338.

In some embodiments, the blockchain herein may be a permissionless blockchain. In contrast with permissioned blockchains which require permission to join, anyone can join a permissionless blockchain. For example, to join a permissionless blockchain a user may create a personal address and begin interacting with the network, by submitting transactions, and hence adding entries to the ledger.

Additionally, all parties have the choice of running a node on the system and employing the mining protocols to help verify transactions.

Figure 3C:
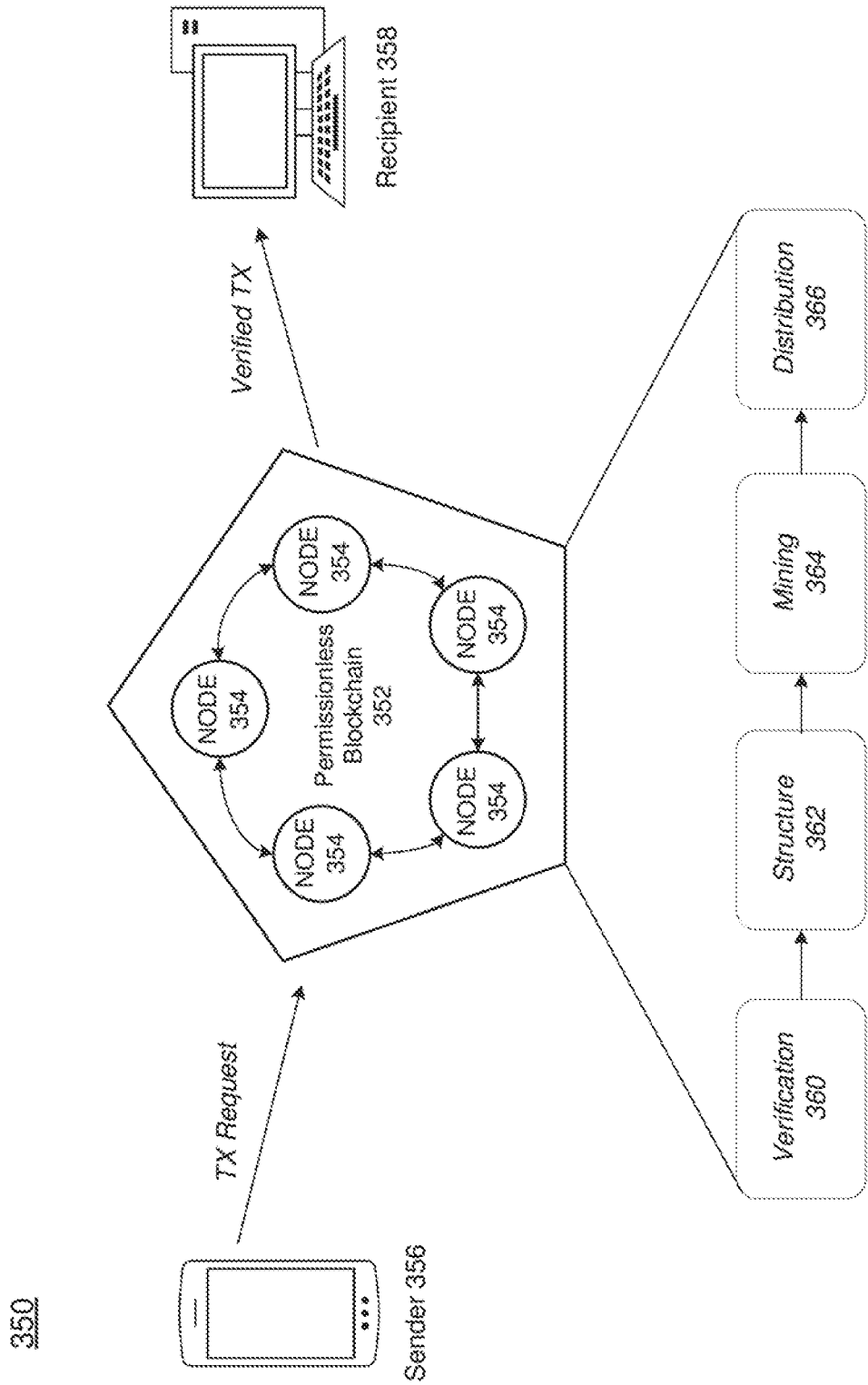

FIG. 3C illustrates a process 350 of a transaction being processed by a permissionless blockchain 352 including a plurality of nodes 354. A sender 356 desires to send payment or some other form of value (e.g., a deed, medical records, a contract, a good, a service, or any other asset that can be encapsulated in a digital record) to a recipient 358 via the permissionless blockchain 352. In one embodiment, each of the sender device 356 and the recipient device 358 may have digital wallets (associated with the blockchain 352) that provide user interface controls and a display of transaction parameters. In response, the transaction is broadcast throughout the blockchain 352 to the nodes 354. Depending on the blockchain's 352 network parameters the nodes verify 360 the transaction based on rules (which may be pre-defined or dynamically allocated) established by the permissionless blockchain 352 creators. For example, this may include verifying identities of the parties involved, etc. The transaction may be verified immediately or it may be placed in a queue with other transactions and the nodes 354 determine if the transactions are valid based on a set of network rules.

In structure 362, valid transactions are formed into a block and sealed with a lock (hash). This process may be performed by mining nodes among the nodes 354. Mining nodes may utilize additional software specifically for mining and creating blocks for the permissionless blockchain 352. Each block may be identified by a hash (e.g., 256 bit number, etc.) created using an algorithm agreed upon by the network. Each block may include a header, a pointer or reference to a hash of a previous block's header in the chain, and a group of valid transactions. The reference to the previous block's hash is associated with the creation of the secure independent chain of blocks.

Before blocks can be added to the blockchain, the blocks must be validated. Validation for the permissionless blockchain 352 may include a proof-of-work (PoW) which is a solution to a puzzle derived from the block's header. Although not shown in the example of FIG. 3C, another process for validating a block is proof-of-stake. Unlike the proof-of-work, where the algorithm rewards miners who solve mathematical problems, with the proof of stake, a creator of a new block is chosen in a deterministic way, depending on its wealth, also defined as "stake." Then, a similar proof is performed by the selected/chosen node.

With mining 364, nodes try to solve the block by making incremental changes to one variable until the solution satisfies a network-wide target. This creates the PoW thereby ensuring correct answers. In other words, a potential solution must prove that computing resources were drained in solving the problem. In some types of permissionless blockchains, miners may be rewarded with value (e.g., coins, etc.) for correctly mining a block.

Here, the PoW process, alongside the chaining of blocks, makes modifications of the blockchain extremely difficult, as an attacker must modify all subsequent blocks in order for the modifications of one block to be accepted. Furthermore, as new blocks are mined, the difficulty of modifying a block increases, and the number of subsequent blocks increases. With distribution, the successfully validated block is distributed through the permissionless blockchain 352 and all nodes 354 add the block to a majority chain which is the permissionless blockchain's 352 auditable ledger. Furthermore, the value in the transaction submitted by the sender 356 is deposited or otherwise transferred to the digital wallet of the recipient device 358.

Figure 3D:
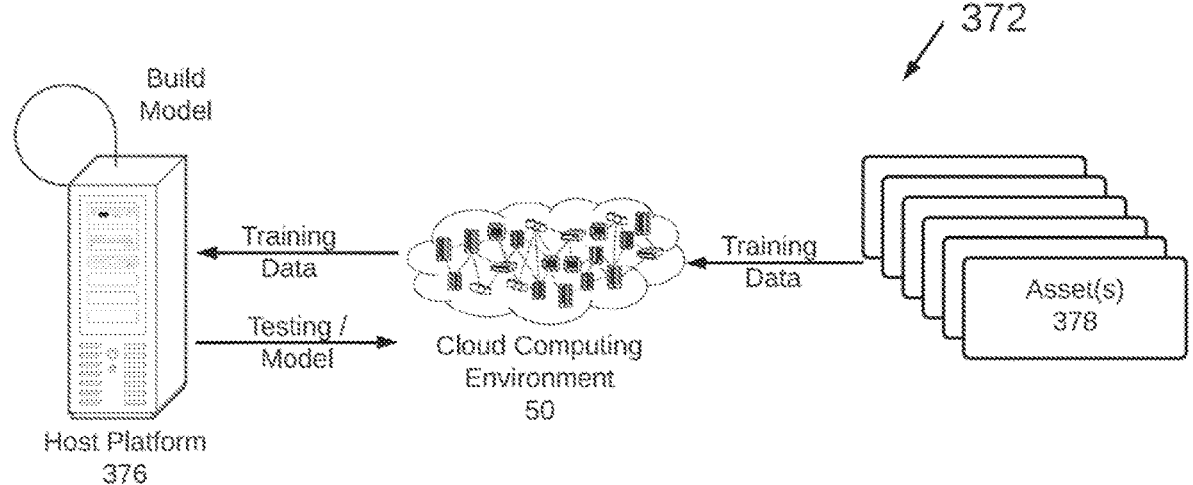
FIG. 3D is a diagram illustrating machine learning process via a cloud computing platform according to an example embodiment.
Figure 3D:
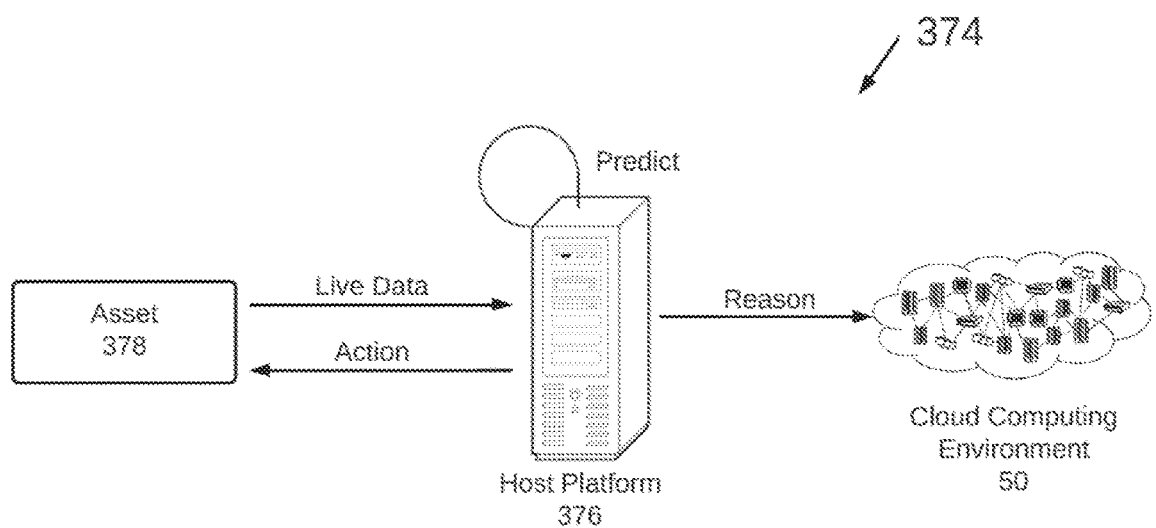
Figure 3E:
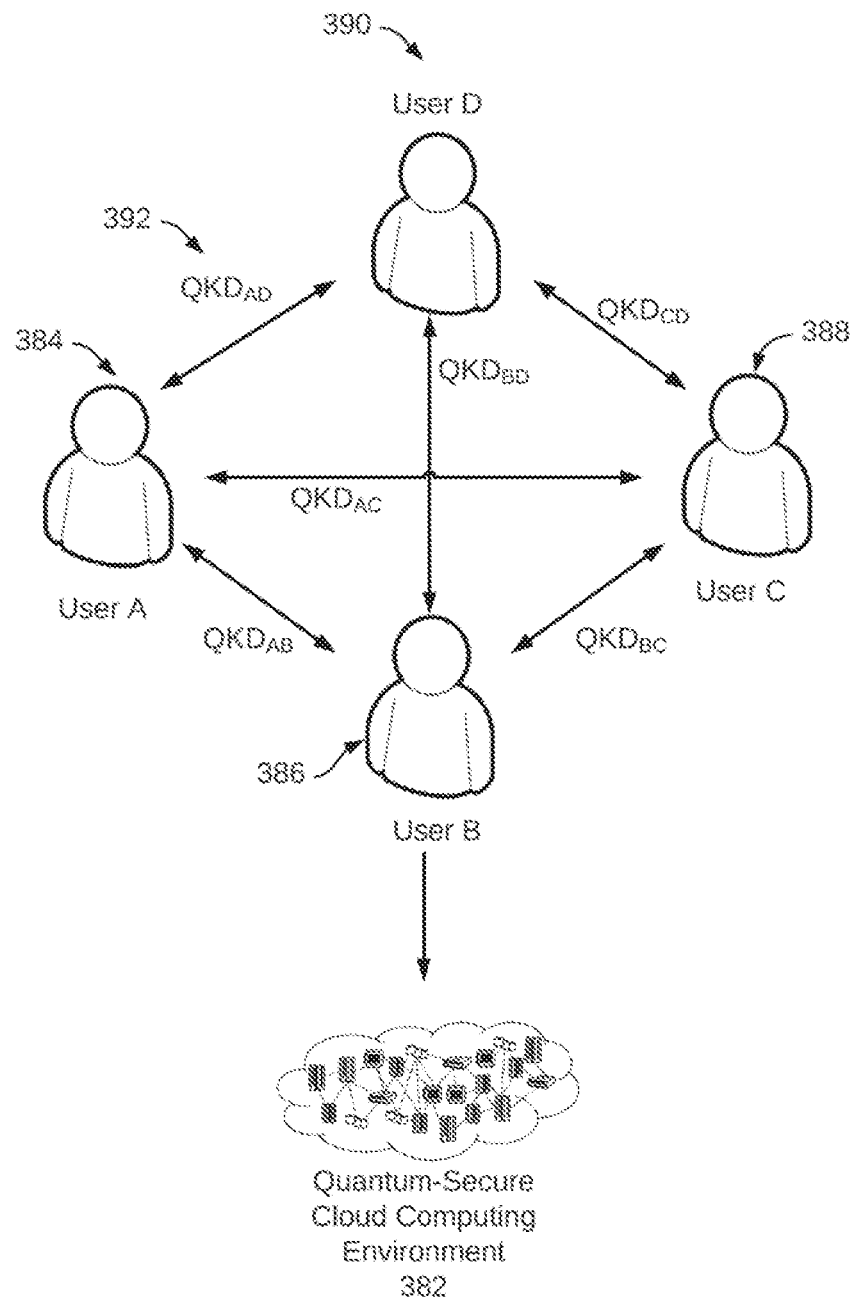
FIG. 3E is a diagram illustrating a quantum computing environment associated with a cloud computing platform according to an example embodiment.

FIGS. 3D and 3E illustrate additional examples of use cases for cloud computing that may be incorporated and used herein. FIG. 3D illustrates an example 370 of a cloud computing environment 50 which stores machine learning (artificial intelligence) data. Machine learning relies on vast quantities of historical data (or training data) to build predictive models for accurate prediction on new data. Machine learning software (e.g., neural networks, etc.) can often sift through millions of records to unearth non-intuitive patterns.

In the example of FIG. 3D, a host platform 376 builds and deploys a machine learning model for predictive monitoring of assets 378. Here, the host platform 366 may be a cloud platform, an industrial server, a web server, a personal computer, a user device, and the like. Assets 378 can be any type of asset (e.g., machine or equipment, etc.) such as an aircraft, locomotive, turbine, medical machinery and equipment, oil and gas equipment, boats, ships, vehicles, and the like. As another example, assets 378 may be non-tangible assets such as stocks, currency, digital coins, insurance, or the like.

The cloud computing environment 50 can be used to significantly improve both a training process 372 of the machine learning model and a predictive process 374 based on a trained machine learning model. For example, in 372, rather than requiring a data scientist/engineer or another user to collect the data, historical data may be stored by the assets 378 themselves (or through an intermediary, not shown) on the cloud computing environment 50. This can significantly reduce the collection time needed by the host platform 376 when performing predictive model training. For example, data can be directly and reliably transferred straight from its place of origin to the cloud computing environment 50. By using the cloud computing environment 50 to ensure the security and ownership of the collected data, smart contracts may directly send the data from the assets to the individuals that use the data for building a machine learning model. This allows for sharing of data among the assets 378.

Furthermore, training of the machine learning model on the collected data may take rounds of refinement and testing by the host platform 376. Each round may be based on additional data or data that was not previously considered to help expand the knowledge of the machine learning model. In 372, the different training and testing steps (and the data associated therewith) may be stored on the cloud computing environment 50 by the host platform 376. Each refinement of the machine learning model (e.g., changes in variables, weights, etc.) may be stored in the cloud computing environment 50 to provide verifiable proof of how the model was trained and what data was used to train the model. For example, the machine learning model may be stored on a blockchain to provide verifiable proof. Furthermore, when the host platform 376 has achieved a trained model, the resulting model may be stored on the cloud computing environment 50.

After the model has been trained, it may be deployed to a live environment where it can make predictions/decisions based on the execution of the final trained machine learning model. For example, in 374, the machine learning model may be used for condition-based maintenance (CBM) for an asset such as an aircraft, a wind turbine, a healthcare machine, and the like. In this example, data fed back from asset 378 may be input into the machine learning model and used to make event predictions such as failure events, error codes, and the like. Determinations made by the execution of the machine learning model at the host platform 376 may be stored on the cloud computing environment 50 to provide auditable/verifiable proof. As one non-limiting example, the machine learning model may predict a future breakdown/failure to a part of the asset 378 and create an alert or a notification to replace the part. The data behind this decision may be stored by the host platform 376 and/or on the cloud computing environment 50. In one embodiment the features and/or the actions described and/or depicted herein can occur on or with respect to the cloud computing environment 50.

FIG. 3E illustrates an example 380 of a quantum-secure cloud computing environment 382, which implements quantum key distribution (QKD) to protect against a quantum computing attack. In this example, cloud computing users can verify each other's identities using QKD. This sends information using quantum particles such as photons, which cannot be copied by an eavesdropper without destroying them. In this way, a sender, and a receiver through the cloud computing environment can be sure of each other's identity.

In the example of FIG. 3E, four users are present 384, 386, 388, and 390. Each pair of users may share a secret key 392 (i.e., a QKD) between themselves. Since there are four nodes in this example, six pairs of nodes exist, and therefore six different secret keys 392 are used including $QKD_{AB}$, $QKD_{AC}$, $QKD_{AD}$, $QKD_{BC}$, $QKD_{BD}$, and $QKD_{CD}$. Each pair can create a QKD by sending information using quantum particles such as photons, which cannot be copied by an eavesdropper without destroying them. In this way, a pair of users can be sure of each other's identity.

The operation of the cloud computing environment 382 is based on two procedures (i) creation of transactions, and (ii) construction of blocks that aggregate the new transactions. New transactions may be created similar to a traditional network, such as a blockchain network. Each transaction may contain information about a sender, a receiver, a time of creation, an amount (or value) to be transferred, a list of reference transactions that justifies the sender has funds for the operation, and the like. This transaction record is then sent to all other nodes where it is entered into a pool of unconfirmed transactions. Here, two parties (i.e., a pair of users from among 384-390) authenticate the transaction by providing their shared secret key 392 (QKD). This quantum signature can be attached to every transaction making it exceedingly difficult to be tampered with. Each node checks its entries with respect to a local copy of the cloud computing environment 382 to verify that each transaction has sufficient funds.

Figure 4A:
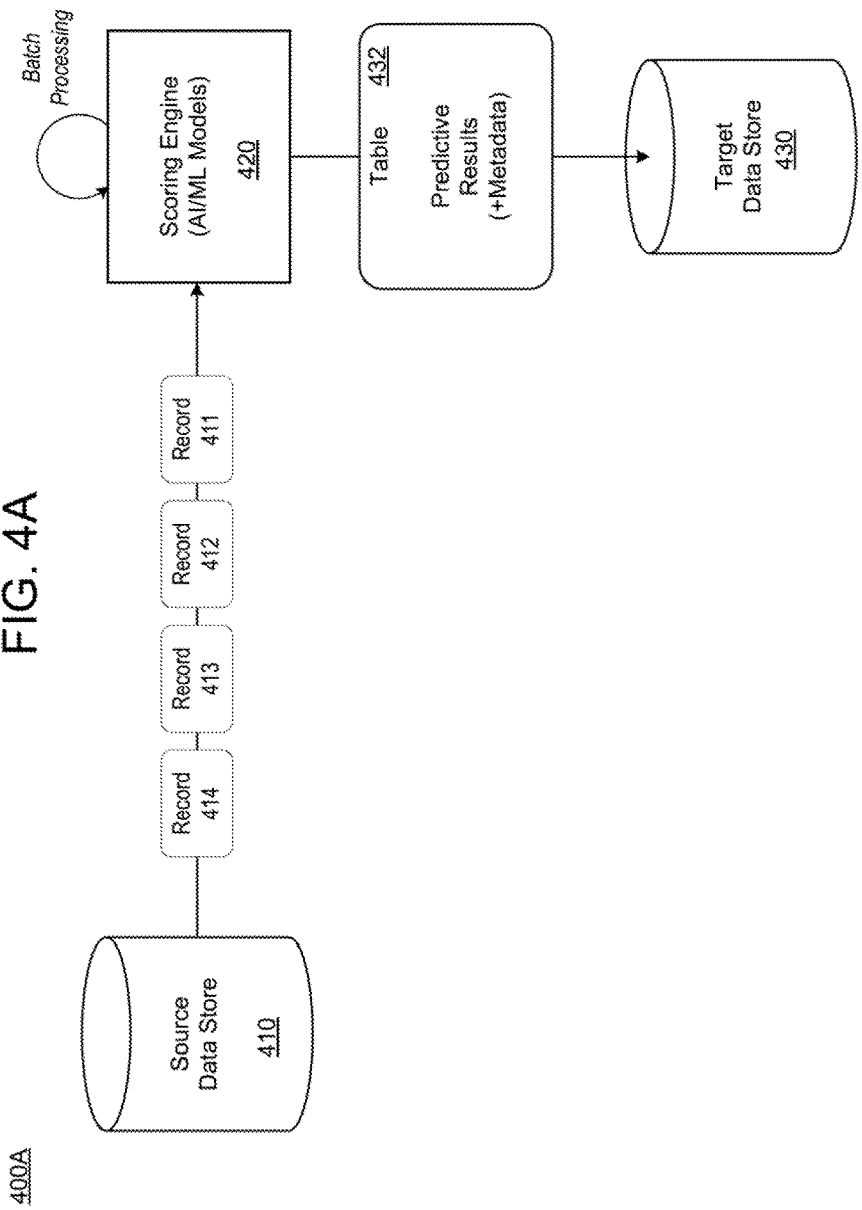
FIGS. 4A-4B are diagrams illustrating batch scoring processes which update an API with schema changes according to example embodiments.
Figure 4B:
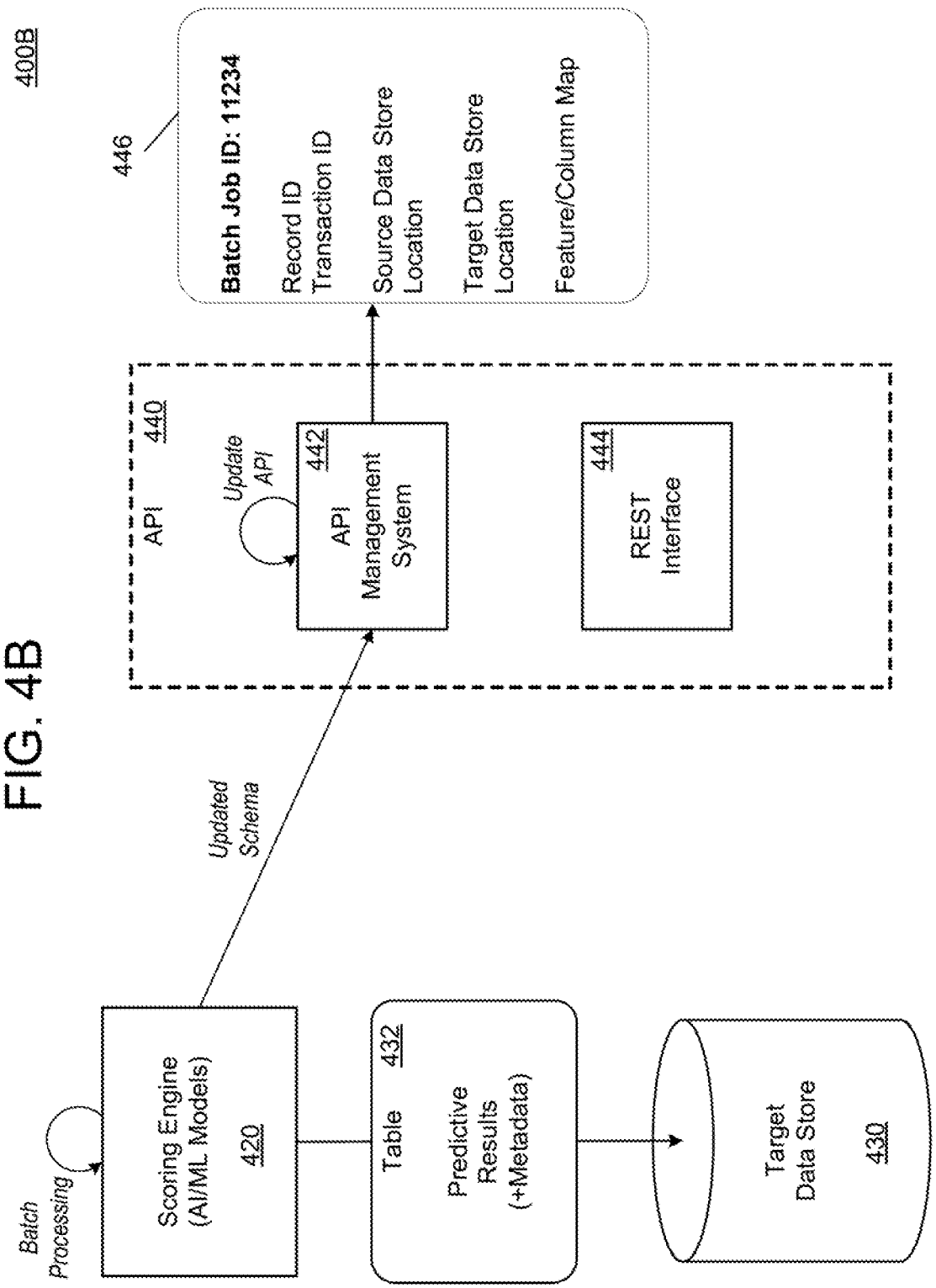

FIGS. 4A-4B illustrate batch scoring processes which update an API with schema changes according to example embodiments. Referring to FIG. 4A, a batch scoring process 400A is shown and includes a plurality of data records 411, 412, 413, and 414 from a source data store 410 being ingested by a scoring engine 420. In this example, the ingesting may include reading a table or other data structure which includes the plurality of data records 411, 412, 413, and 414, and then executing each of the data records in sequence. As one example, the records may correspond to rows or columns in a table. Thus, each iterative execution of the scoring process may score one record. It should also be appreciated that multiple models (e.g., AI/ML, etc.) may be initiated simultaneously and used to simultaneously score the data records being ingested by a scoring engine 420 for faster processing.

The predictive outputs generated by the scoring engine 420, including any predictions such as classifications, identifications, text outputs, and the like, may be stored within a table 432 or other data record. In addition, metadata associated with the predictions and the scoring process such as concept drift that is identified by the scoring engine 420 or bias that is identified by the scoring engine 420. The scoring engine 420 may store the table 432 in a target data store 430 that is separate from the source data store 410 (or is integrated in the same data store, etc.)

FIG. 4B illustrates an API update process 400B for updating an API 440 of the host platform based on the batch scoring process 400A performed in FIG. 4A, in accordance with example embodiments. In some embodiments, the API 440 may be logically positioned over any of a source data store (not shown), the scoring engine 420, and the target data store 430. In some embodiments, the process 400B may be performed simultaneously with the process 400A shown in FIG. 4A. For example, the scoring engine 420 may transmit the table 432 to the target data store 430 and transmit an update to the API 440 shown in FIG. 4B, at the same time. It should also be appreciated that the process 400A.

In this example, the scoring engine 420 may update a schema of the batch scoring process which may include updates to one or more of a location of the input data in the source database, a location of the output data stored in the target database 430, a location of metadata from the batch scoring process stored in the target database 430, and the like. For example, the schema update may include information about which features of input data are stored in which column(s) of a table (of the input data), which column(s) include the predicted output, which column(s) include the transaction IDs/record IDs of the input data, and the like. As an example, the schema update may be an API call or a request message that is sent to an API management system 442 of the API 440. The API management system 442 may manage a local file or table with the particular schema details of each batch processing job performed by the scoring engine 420. The API management system 442 may update a local file 446 of the schema for the batch processing job (e.g., identified by processing ID, etc.) that was just run by the scoring engine 420 based on the updated schema data from the scoring engine 420.

FIG. 4C illustrates a process 400C of fetching results from a batch scoring process via the API 440 according to example embodiments. A majority of the steps performed by the API 440 may be performed after the batch scoring process shown in FIG. 4A. However, as part of the batch scoring process shown in FIG. 4A, the API 440 may validate whether the source data store 410 and the target data store 430 are available or not. Furthermore, the API 440 may also check for the availability of the configured model monitoring solution.

After the batch scoring process is performed, the API 440 may read the data from the data stores which are used by the batch scoring model and return information such as model prediction, confidence and optionally the feature values for a specific record id. In the example of FIG. 4C, the API 440 reads data from the target data store 430, however, it should be appreciated that the API 440 may read data from the source data store 410 as well, such as if the input feature data used by the scoring engine 420 is not available in the target data store 430, to double check the input feature data in the target data store 430, or any other reason.

According to various embodiments, the API 440 may expose an endpoint 448 to a REST interface 444 of the API 440. The endpoint 448 is configured to receive API calls or other messages from different software applications including application 450. As an example, the REST interface 444 may receive an API call from the software application 450 with an identifier of a batch processing job or a record of a batch processing job. In response, the REST interface 444 may query the API management system 442 of the API 440 for the schema data associated with the batch processing job such as a location of the target data store 430 where the predicted output and metadata are stored.

The schema data may also provide a location of the target data store 430 where the input feature data is stored. In response, the REST interface 444 or other component of the API 440 may fetch the target data from the locations identified by the schema in the API management system 442, and return the target data to the software application 450. This same process may be repeated for software applications that are written in different programming languages because they each share the common API 440. For example, the target data fetched by the API 440 may include feature values for a given predicted output (and the output itself), metadata associated with the prediction such as bias detected or concept drift detected, the input data itself, and the like.

Figure 5:
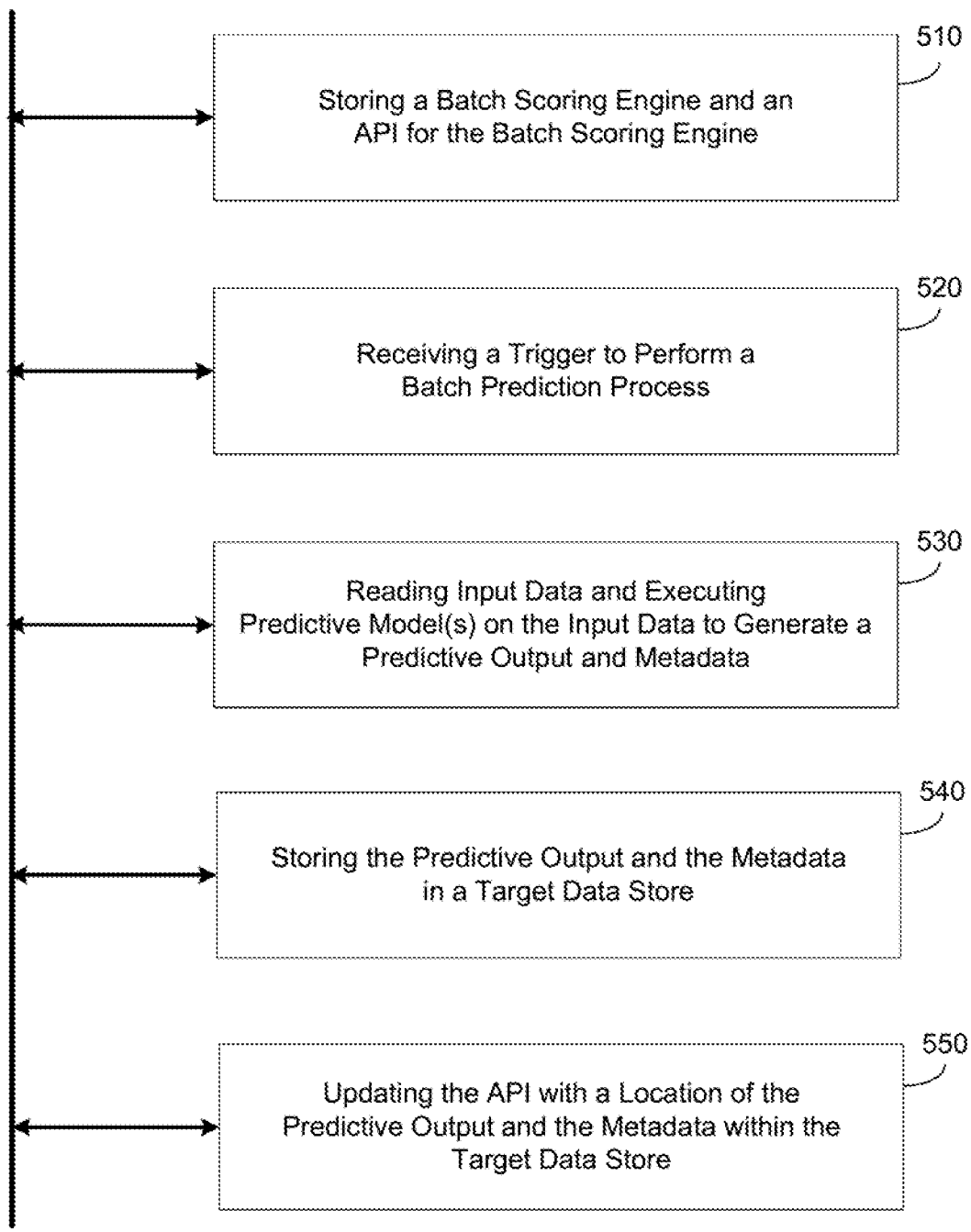
FIG. 5 is a diagram illustrating a method of managing an API for batch scoring models according to an example embodiment.

FIG. 5 illustrates a method 500 of a method of managing an API for batch scoring models according to an example embodiment. For example, the method 500 may be performed by a computer system such as a cloud platform, a web server, a personal computer or other user device, and the like. Referring to FIG. 5, in 510 the method may include storing a batch scoring engine and an application programming interface (API) for the batch scoring engine.

In 520, the method may include receiving a trigger to perform a batch prediction process. In 530, the method may include reading input data from a source data store and executing, via the batch scoring engine, one or more predictive models on the input data to generate a predictive output and metadata associated with the predictive output. In 540, the method may include storing the predictive output and the metadata in a target data store. In 550, the method may include updating the API with a location of the predictive output within the target data store and a location of the metadata within the target data store.

In some embodiments, the API may include a representational state transfer (REST) interface disposed over one or more predictive models embodied within the batch scoring engine. In some embodiments, the method may further include exposing an endpoint for the API which is configured to receive API calls from one or more software applications and return the predictive output and the metadata from the target data store to the one or more software applications.

In some embodiments, the method may further include receiving an API call from a software application with a record identifier of the predictive output, and in response to the API call, fetching one or more of a model prediction, a confidence of the model prediction, and input feature values, from the location of the predictive output which is included in the updated API and transmitting the one or more of the model prediction, the confidence of the model prediction, and input feature values to the software application. In some embodiments, the method may further include detecting that the input feature values are not present in the target data store, and in response, retrieving the input feature values from the source data store based on a location of the input feature values included in the updated API.

In some embodiments, the method may further include receiving an API call from a software application with a record identifier of the predictive output, and in response to the API call, fetching one or more of concept drift attributes and bias attributes of the batch scoring process from the location of the metadata which is included in the updated API and transmitting the one or more of the concept drift attributes and the bias attributes to the software application. In some embodiments, the updating may include updating an API management system of the API with schema attributes of a table in the target data store which stores the predictive output. In some embodiments, the schema attributes may include an identifier of a column within the target data store which contains the input data, an identifier of a column that contains a record identifier, and an identifier of a column that contains the predictive output.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 6:
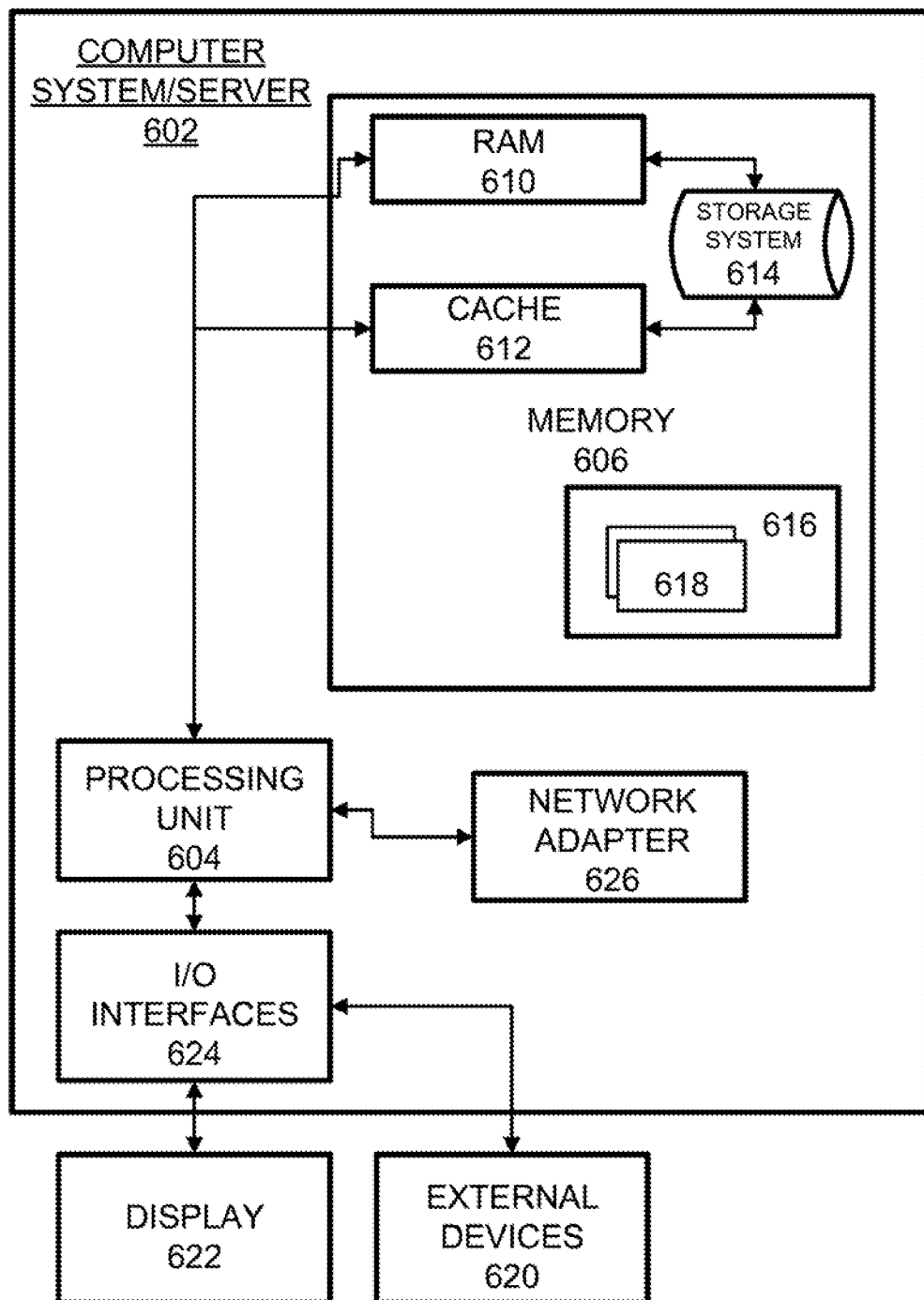
FIG. 6 is a diagram illustrating an example of a computing system that supports one or more of the example embodiments.

FIG. 6 illustrates an example system 600 that supports one or more of the example embodiments described and/or depicted herein. The system 600 comprises a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus, comprising:
an Application Program Interface (API); and
a batch scoring engine in communication with the API, wherein a processor of the batch storing engine is configured to:
request input data from a data source in response to receiving a trigger identifying the input data, wherein the input data comprises a plurality of records,
perform a batch scoring process on the input data, wherein when the processor performs the batch scoring process, the processor is further configured to:
iteratively read each record of the plurality of records from a source data store into a predictive model executed by the batch scoring engine, and
iteratively execute the predictive model for each record of the plurality of records to generate a predictive output and metadata associated with the predictive output for each of the records,
store the predictive output and the metadata in a target data store,
update the API with a location of the predictive output within the target data store and a location of the metadata within the target data store, wherein one or more of a model prediction, a confidence of the model prediction, or input feature values are stored at the location of the predictive output, and are used to generate a response to an API call from a software application.

2. The apparatus of claim 1, wherein the API comprises:
a representational state transfer (REST) interface disposed over one or more predictive models executed by the batch scoring engine.

3. The apparatus of claim 1, wherein a processor of the API is configured to:
expose an endpoint to the API, wherein the endpoint is configured to:
receive an API call from one or more software applications, and
return the predictive output and the metadata from the target data store to the one or more software applications in response to the API call.

4. The apparatus of claim 1, wherein the API call comprises a record identifier of the predictive output.

5. The apparatus of claim 1, wherein a processor of the API is configured to:
detect that the input feature values are not present in the target data store, and
in response, retrieve the input feature values from the source data store based on a location of the input feature values included in the updated API.

6. The apparatus of claim 1, wherein a processor of the API is further configured to:
receive an API call from a software application, wherein the API call comprises a record identifier of the predictive output, and
in response to the API call, fetch one or more of concept drift attributes of the batch scoring process or bias attributes of the batch scoring process from the location of the metadata, which is included in the updated API, and
transmit the one or more of the concept drift attributes or the bias attributes to the software application.

7. The apparatus of claim 1, wherein, when the processor of the batch scoring engine is configured to update the API, the processor of the batch scoring engine is further configured to:
update an API management system of the API with schema attributes of a table in the target data store that stores the predictive output.

8. The apparatus of claim 7, wherein the schema attributes comprise:
an identifier of a column within the target data store containing the input data, an identifier of a column containing a record identifier, and an identifier of a column containing the predictive output.

9. A method, comprising:
requesting input data from a data source by a processor of a batch scoring engine in response to receiving a trigger identifying the input data, wherein the input data comprises a plurality of records;
performing a batch scoring process on the input data by the processor of the batch scoring engine, wherein the performing the batch scoring process is further comprises:
iteratively reading, by the processor of the batch scoring engine, each record of the plurality of records from a source data store into a predictive model executed by the batch scoring engine, and iteratively executing, by the processor of the batch scoring engine, the predictive model for each record of the plurality of records to generate a predictive output and metadata associated with the predictive output for each record of the plurality of records;

storing the predictive output and the metadata in a target data store; and updating an Application Program Interface (API) in communication with the batch scoring engine with a location of the predictive output within the target data store and a location of the metadata within the target data store, wherein one or more of a model prediction, a confidence of the model prediction, or input feature values are stored at the location of the predictive output and are used to generate a response to an API call from a software application.

10. The method of claim 9, wherein the API comprises:
a representational state transfer (REST) interface disposed over one or more predictive models executed by the batch scoring engine.

11. The method of claim 9, wherein the method further comprises:
exposing an endpoint for the API by a processor of the API, wherein the endpoint is configured to perform:
receiving an API call from one or more software applications, and
returning the predictive output and the metadata from the target data store to the one or more software applications in response to the API call.

12. The method of claim 9, wherein the API call comprises a record identifier of the predictive output.

13. The method of claim 9, wherein the method further comprises:
detecting that the input feature values are not present in the target data store by a processor of the API; and
in response, retrieving, by the processor of the API, the input feature values from the source data store based on a location of the input feature values included in the updated API.

14. The method of claim 9, wherein the method further comprises:
receiving, by a processor of the API, an API call from a software application, wherein the API call comprises a record identifier of the predictive output; and
in response to the API call, fetching, by the processor of the API, one or more of concept drift attributes of the batch scoring process or bias attributes of the batch scoring process from the location of the metadata included in the updated API;
and transmitting the one or more of the concept drift attributes or the bias attributes to the software application.

15. The method of claim 9, wherein the updating the API further comprises:
updating an API management system of the API with schema attributes of a table in the target data store that stores the predictive output.

16. The method of claim 15, wherein the schema attributes comprise:
an identifier of a column within the target data store containing the input data, an identifier of a column containing a record identifier, and an identifier of a column containing the predictive output.

17. A non-transitory computer-readable storage medium comprising instructions that, when executed by a processor of a batch scoring engine, cause the processor of the batch scoring engine to perform:
requesting input data from a data source in response to receiving a trigger identifying the input data, wherein the input data comprises a plurality of records;
performing a batch scoring process on the input data, wherein the performing the batch scoring process is further comprises:
iteratively reading each record of the plurality of records from a source data store into a predictive model executed by the batch scoring engine, and
iteratively executing the predictive model for each record of the plurality of records to generate a predictive output and metadata associated with the predictive output for each record of the plurality of records;
storing the predictive output and the metadata in a target data store; and
updating an Application Program Interface (API) in communication with the batch scoring engine with a location of the predictive output within the target data store and a location of the metadata within the target data store, wherein one or more of a model prediction, a confidence of the model prediction, or input feature values are stored at the location of the predictive output and are used to generate a response to an API call from a software application.

18. The non-transitory computer-readable storage medium of claim 17, wherein the instructions further cause a processor of the API to perform:
exposing an endpoint for the API, wherein the endpoint is configured to perform:
receiving an API call from one or more software applications, and
returning the predictive output and the metadata from the target data store to the one or more software applications in response to the API call.

19. The non-transitory computer-readable storage medium of claim 17, wherein the updating the API further comprises:
updating an API management system of the API with schema attributes of a table in the target data store that stores the predictive output.

20. The non-transitory computer-readable storage medium of claim 19, wherein the schema attributes comprise:
an identifier of a column within the target data store containing the input data, an identifier of a column containing a record identifier, and an identifier of a column containing the predictive output.

* * * * *